United States Patent
Okamoto et al.

(10) Patent No.: US 8,185,756 B2
(45) Date of Patent: May 22, 2012

(54) SYSTEM AND METHOD FOR TRANSMITTING A POWER CONTROL SIGNAL TO AN EXTERNAL DEVICE BASED ON THE PRESENCE OF LINKAGE INFORMATION

(75) Inventors: Wataru Okamoto, Osaka (JP); Koji Amemiya, Osaka (JP); Yoshiyasu Kado, Nara (JP); Masahiko Kuwahara, Hyogo (JP); Tetsuji Aibara, Osaka (JP)

(73) Assignee: Panasonic Corporation, Osaka (JP)

( * ) Notice: Subject to any disclaimer, the term of this patent is extended or adjusted under 35 U.S.C. 154(b) by 447 days.

(21) Appl. No.: 12/556,636

(22) Filed: Sep. 10, 2009

(65) Prior Publication Data

US 2010/0070783 A1    Mar. 18, 2010

(30) Foreign Application Priority Data

Sep. 11, 2008 (JP) .................................. 2008-233224

(51) Int. Cl.
 G06F 1/00 (2006.01)
 G06F 1/26 (2006.01)
(52) U.S. Cl. ................... 713/300; 713/310; 713/320
(58) Field of Classification Search .................. 713/300, 713/310, 320
 See application file for complete search history.

(56) References Cited

U.S. PATENT DOCUMENTS

| 5,784,628 A * | 7/1998 | Reneris .......................... 713/300 |
| 7,363,521 B1 * | 4/2008 | Mehan ........................... 713/300 |
| 2005/0114719 A1 * | 5/2005 | Stedman et al. ............... 713/310 |
| 2008/0074411 A1 | 3/2008 | Yamashita |
| 2009/0193109 A1 * | 7/2009 | Kuo et al. ....................... 709/223 |

FOREIGN PATENT DOCUMENTS

| EP | 1903795 A | 3/2008 |
| JP | 9-51584 A | 2/1997 |
| JP | 2008-34907 A | 2/2008 |
| JP | 2008-79135 A | 4/2008 |
| JP | 2008-98791 | 4/2008 |
| JP | 2008-98850 A | 4/2008 |

* cited by examiner

*Primary Examiner* — Mark Connolly
(74) *Attorney, Agent, or Firm* — Panasonic Patent Center; Dhiren Odedra; Kerry Culpepper

(57) ABSTRACT

An electronic device capable of controlling a power state of an external device from a first power state (ex. "Standby") to a second power state (ex. "ON") includes a determination unit operable to determine whether information indicating linkage is stored in a storage unit when it is detected that communication between the electronic device and the external device is enabled, and a transmitting unit operable to transmit a control signal for controlling power state of the external device. When the information indicating linkage is not stored in the storage unit, the transmitting unit stores the information indicating linkage and transmits the control signal for controlling power state of the external device to the second power state to the external device. When the information indicating linkage is stored in the storage unit, the transmitting unit refrains from transmitting the control signal to the external device.

13 Claims, 11 Drawing Sheets

SYSTEM AND METHOD FOR TRANSMITTING A POWER CONTROL SIGNAL TO AN EXTERNAL DEVICE BASED ON THE PRESENCE OF LINKAGE INFORMATION

BACKGROUND

1. Technical Field

The technical field relates to an electronic device that can communicate with an external device, particularly to an electronic device that can transmit a control signal to an external device to change a power state of the external device. The technical field also relates to a power control method between the electronic device and the external device.

2. Related Art

JP-9-51584A discloses an electronic device that can transmit a control signal to an external device to control operation of the external device. In JP-9-51584A, a VTR (video tape recorder) is connected to a TV (television set) through a control line to supply a control signal to the TV through the control line. When receiving the control signal, the TV operates according to the control signal. HDMI (High Definition Multimedia Interface) can be used, for example, as means for connecting the TV and VTR. HDMI cable according to HDMI includes a signal line and a control line.

An example of control of the video camera through HDMI will be described below. In the following description, it is assumed that power state of the video camera is "ON" and the video camera is connected to the TV through the HDMI cable.

When connected to the TV through the HDMI cable, the video camera detects that communication with the TV based on the control signal is turned to be enable from disable. Then the video camera obtains information on the power state of the TV. When the power state of TV is "standby" state, the video camera transmits a power control signal to the TV to switch the power state of the TV from "standby" to "ON".

However, according to the aforementioned control, when the power state of the TV is changed from "standby" state to "OFF" state due to an influence of an power outage and is subsequently changed from "OFF" state to "standby" state, the following problem occurs in the control.

The video camera usually operates based on an electric power supplied from a secondary battery. Therefore, even in the power outage, the power state of the video camera is not changed, that is, remains in "ON". On the other hand, the TV usually operates based on electric power supplied from commercial power source. Therefore, when the power outage occurs while the power state of the TV is "standby" state, the supply of electric power is stopped to turn the power state of the TV to "OFF". Thereafter, when the power outage is eliminated, the electric power is supplied to the TV again, causing the power state of the TV to become "standby" (note: the power state of the TV may not become "standby" depending on the specification).

For this reason, the video camera with power state of "ON" at the power outage detects that the communication based on the control signal becomes "disable" by the power state of the TV changing from "ON" or "standby" to "OFF". Thereafter, when the power outage stops, the video camera detects that the communication based on the control signal is switched from "disable" state to "enable" state by changing the power state of the TV from "OFF" to "standby". Then, as described above, the video camera obtains the power state of the TV. Since the obtained power state of the TV is "standby", the video camera transmits the power control signal in order to change the power state of the TV to "ON" so that TV is turned on.

When the power state of the TV is changed by occurrence/stop of the power outage, the video camera controls the power supply of the TV to change the power state from "standby" to "ON". In this manner, when the power outage occurs while the TV connected to the video camera is in "standby" state and then the power outage stops, the power state of the TV is automatically changed from "standby" to "ON", and then the power supply of the TV remains in "ON" state. That is, although the user has intended to set the power state of the TV to "standby", the TV is turned on without user's knowing.

SUMMARY

To solve the above problems, provided is an electronic device which can control power state of an external device through a communication line, capable of preventing the power state of the external device from being automatically turned on when the power state of the external device changes due to the power outage and so on. A power control method for such an electronic device and external device is also provided.

In a first aspect, an electronic device that communicates with an external device and can change a power state of the external device from a first power state to a second power state is provided. The electronic device includes a communication unit operable to communicate with the external device, a storage unit operable to store information indicating linkage, a detection unit operable to detect that communication between the electronic device and the external device through the communication unit is enabled, a determination unit operable to determine whether the information indicating linkage is stored in the storage unit when the detection unit detects that the communication between the electronic device and the external device is enabled, and a transmitting unit. The transmitting unit is operable to store the information indicating linkage in the storage unit and transmit a control signal for controlling power state of the external device to the second power state to the external device when the information indicating linkage is not stored in the storage unit by the determination unit, but to refrain from transmitting the control signal to the external device when the information indicating linkage is stored in the storage unit by the determination unit.

In a second aspect, a method is provided for controlling a power state of a second device from a first power state to a second power state by a first device. According to he method, it is detected whether communication between the first device and the second device is enabled. It is determined whether information indicating linkage is stored when it is detected that the communication between the first device and the second device is enabled. When it is determined that the information indicating linkage is not stored, the information indicating linkage is stored and a control signal for controlling the power state of the external device to the second power state is transmitted to the external device. When it is determined that the information indicating linkage is stored, the control signal is refrained from transmitting to the external device.

According to the aforementioned aspects, the electronic device capable of communicating with the external device, can control the turn-on of the external device in proper timing while preventing the power state of the external device from being automatically changed from the first power state (for example, "standby" state) to the second power state (for example, "ON" state), even when the power state is changed from the first power state or second power state to "OFF" state due to the power outage and afterward the power state of the external device is changed from "OFF" state to the first power state.

DETAILED DESCRIPTION OF PREFERRED EMBODIMENT

First Embodiment

An embodiment of an linkage operation system including an external device and an electronic device will be described below with reference to the accompanying drawings.

1. Configuration of Linkage Operation System

Figure 1:
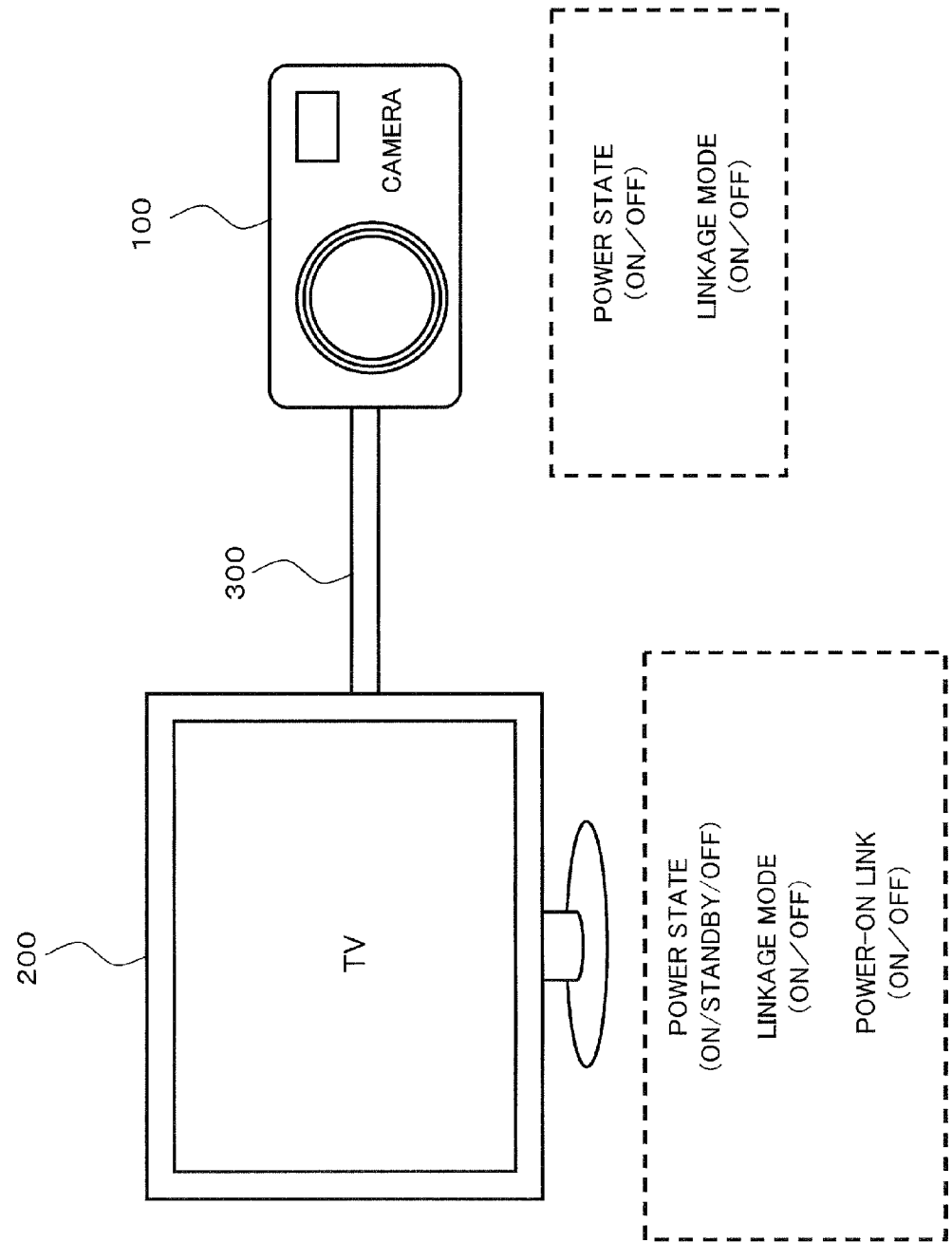
FIG. 1 is a schematic diagram for describing a linkage operation system according to a first embodiment.

Referring to FIG. 1, an linkage operation system includes a digital camera 100 that is an electronic device and a television receiver 200 that is an external device. The digital camera 100 and the television receiver 200 can be connected through an HDMI cable 300. The HDMI cable 300 includes a data line and a control line, enabling communication of a data signal and a control signal between the digital camera 100 and the television receiver 200.

1-1. Configuration and Basic Operation of Digital Camera

Figure 2:
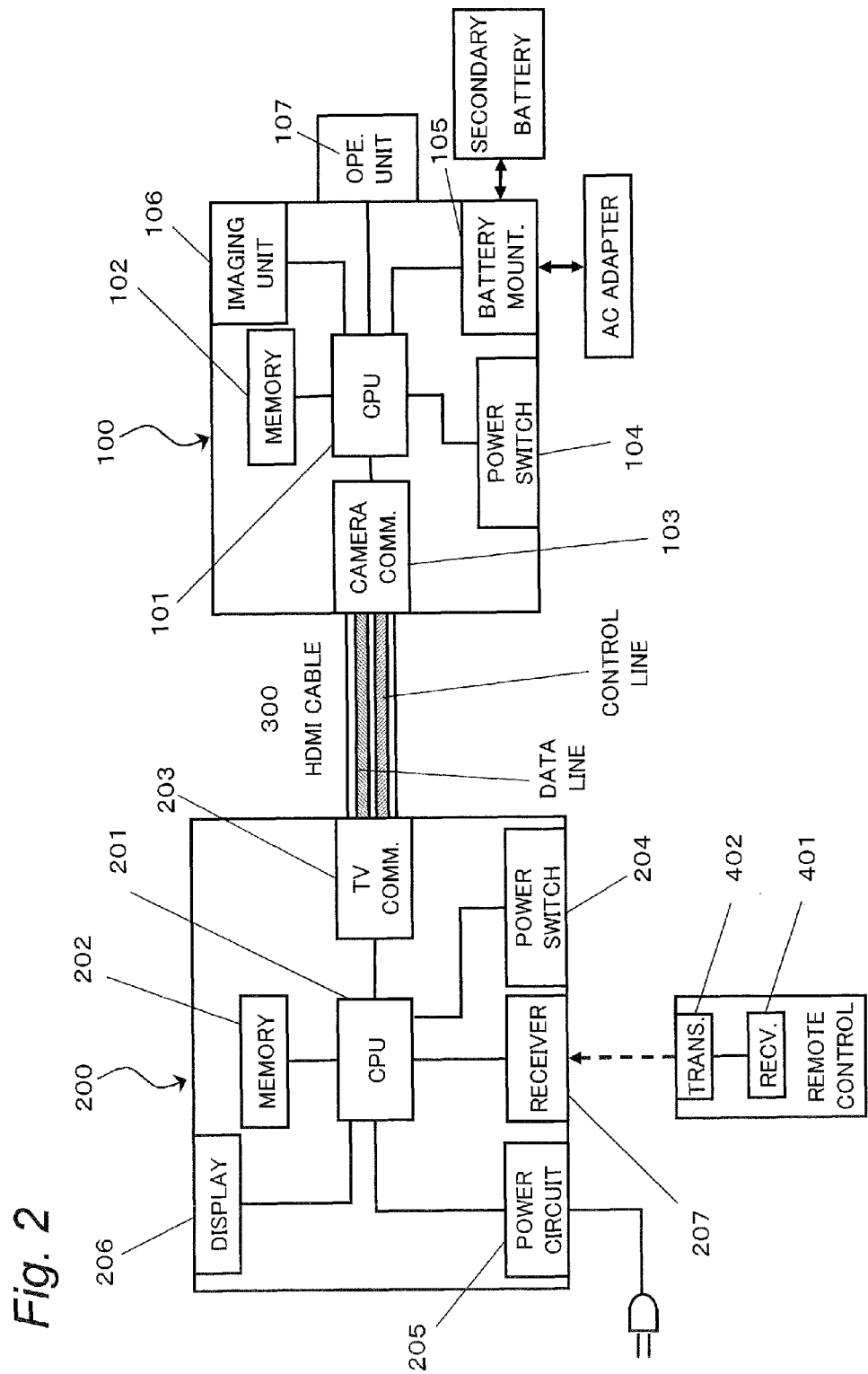
FIG. 2 is a block diagram showing a example configuration of the linkage operation system of the first embodiment.

Referring to FIG. 2, the digital camera 100 includes a camera CPU 101, a camera memory 102, a camera communication unit 103, a camera power switch 104, a battery mounting unit 105, and an imaging unit 106. The digital camera 100 captures a subject image with the imaging unit 106 to produce image data, and stores the produced image data in the camera memory 102. The digital camera 100 has "ON" and "OFF" as a power state.

The digital camera 100 has an linkage operation mode which can be set to "ON" or "OFF". When the linkage operation mode is set to "ON", the digital camera 100 performs a linkage operation with the television receiver 200. In the present embodiment, the setting of the linkage operation mode can be changed by a dedicated button (not shown). For example, the linkage operation mode may be set through a setting screen displayed on a liquid crystal display monitor of the digital camera 100. The setting of the linkage operation may be changed by using an operation unit 107.

For example, the camera CPU 101 includes a microcomputer to control the respective units of the digital camera 100. The camera memory 102 includes a ROM or a RAM which can store various kinds of information and image data.

The camera communication unit 103 is a hardware interface to which the HDMI cable 300 can be connected. The camera communication unit 103 can supply a data signal and a control signal from a TV-CPU 201 of the television receiver 200 to a camera CPU 101, and also supply a data signal and a control signal from the camera CPU 101 to the TV-CPU 201.

The camera power switch 104 includes a button and the like provided outside the digital camera 100. The camera power switch 104 transmits a power switching signal to the camera CPU 101 in response to an instruction from a user. The camera CPU 101 switches the power state between "ON" and "OFF" every time the camera CPU 101 receives the power switching signal. That is, when the power state of the digital camera 100 is "OFF", the camera CPU 101 switches the power state of the digital camera 100 from "OFF" to "ON" upon receiving the power switching signal from the camera power switch 104. When the power state of the digital camera 100 is "ON", the camera CPU 101 switches the power state of the digital camera 100 from "ON" to "OFF" upon receiving the power switching signal from the camera power switch 104.

The battery mounting unit 105 is a unit on which a DC coupler connected to an AC adaptor or a secondary battery can be mounted. The battery mounting unit 105 can supply electric power to each unit of the digital camera 100 when the power supply such as the AC adaptor or the secondary battery is connected to the battery mounting unit 105. The battery mounting unit 105 supplies the electric power to each unit of the digital camera 100 from the mounted power supply when the power state of the digital camera 100 is "ON". A circuit capable of determining a type of the mounted power supply (such as the power supply connected to the AC adaptor and the secondary battery) is provided in the battery mounting unit 105. Specifically the battery mounting unit 105 determines the type of the power supply based on the electric power supplied from the power supply when the power supply is mounted. The method of determining the power supply type is not limited to the aforementioned method.

The imaging unit 106 includes an imaging device such as a CCD image sensor and a CMOS image sensor, and captures a subject image formed by a lens system to generate the image data. The image data outputted from the imaging unit 106 is subjected to an image processing by a image processor (not shown) and is fed to the camera CPU 101. The camera CPU 101 records the image data in the camera memory 102.

1-2. Configuration and Basic Operation of Television Receiver

The television receiver 200 includes the TV-CPU 201, a TV memory 202, a TV communication unit 203, a TV power switch 204, a power supply circuit 205, a display unit 206, and a light receiving unit 207. The television receiver 200 can display an image on the display unit 206. The television receiver 200 receives an operation signal from a remote controller 400 and controls each unit according to the operation signal. The television receiver 200 has a "standby" state as the power state in addition to "ON" and "OFF" states. The "standby" state is a state during which the power is supplied externally to the television receiver 200 but at least the display unit 206 is not supplied with the power so that the image is not displayed on the display unit 206. When the television receiver 200 is in "standby" state, a video image is not displayed in the television receiver 200, but the operation signal can be received from the remote controller 400.

The television receiver 200 has an "linkage operation mode" in which a linkage operation with an external device (in the present embodiment, digital camera 100) can be performed. The linkage operation mode can be set to "ON" or "OFF" through a dedicated button. The television receiver 200 performs the linkage operation with the digital camera 100 when the linkage operation mode is set to "ON". The setting of the linkage operation mode may be changed through a setting screen displayed on the display unit 206 in response to the operation signal of the remote controller 400.

The television receiver 200 also has a setting of "power-on link" in the linkage operation. "power-on link" is a setting in which the external device (in the present embodiment, digital camera 100) can perform the power-supply control of the television receiver 200. "power-on link" can be set to "ON" or "OFF". When "power-on link" is set to "ON", the television receiver 200 can receive a power control signal from the digital camera 100 and switch the power state from the "standby" to "ON". Specifically, in cases where power-on link is in "ON" state, when the power state of the television receiver 200 is "standby" and the television receiver 200 receives the power control signal from the digital camera 100, the television receiver 200 performs the operation to switch the power state thereof from "standby" to "ON". The details of the linkage operation between the digital camera 100 and the television receiver 200 will be described below. In the television receiver 200, the setting of "power-on link" can be changed through the setting screen displayed on the display unit 206 in response to the operation signal of the remote controller 400.

The TV-CPU 201 includes a microcomputer and the like to control each unit of the television receiver 200. The TV memory 202 includes a ROM or a RAM which can store various kinds of information or image data.

The TV communication unit 203 is a hardware interface to which the HDMI cable 300 can be connected. The TV communication unit 203 can supply a data signal and a control signal from the camera CPU 101 of the digital camera 100 to the TV-CPU 201, and also supply a data signal and control signal from the TV-CPU 201 to the camera CPU 101.

The TV power switch 204 includes a button and the like provided outside the television receiver 200. The TV power switch 204 receives the instruction from the user, and transmits the power switching signal to the TV-CPU 201. The TV-CPU 201 switches the power state in response to the power switching signal. Specifically, when the power state of the television receiver 200 is "OFF" state, the TV-CPU 201 switches the power state of the television receiver 200 from "OFF" to "ON" upon receiving the power switching signal from the TV power switch 204. When the power state of the television receiver 200 is "standby", the TV-CPU 201 switches the power state of the television receiver 200 from "standby" to "OFF" upon receiving the power switching signal from the TV power switch 204. When the power state of the television receiver 200 is "ON", the TV-CPU 201 switches the power state of the television receiver 200 from "ON" to "OFF" upon receiving the power switching signal from the TV power switch 204. The TV-CPU 201 stores the current power state in the TV memory 202. Therefore, when the electric power is cut off due to the power outage and the like and afterward the electric power is supplied again from a commercial power source, it is determined that abnormal end occurs and the television receiver 200 is controlled to recover to the power state prior to the power outage. That is, when the electric power is cut off from the commercial power source while the power state is "ON" and afterward the electric power is supplied again, the power state is switched from "OFF" to "ON" to start up the television receiver 200. When the electric power is cut off from the commercial power source with the power state in "standby" and afterward the electric power is supplied again, the power state is switched from "OFF" to "ON" to start up the television receiver 200.

The power supply circuit 205 is a circuit for supplying the electric power to each unit from the commercial power source. The power supply circuit 205 is connected to an electric cord with an attachment plug provided at an end of the electric cord. When the attachment plug is inserted in an outlet or the like, the electric power is supplied from the commercial power source.

The display unit 206 is a monitor including a liquid crystal display panel, PDP (Plasma Display Panel), or the like. The display unit 206 displays the image supplied from the TV-CPU 201.

The light receiving unit 207 is an optical sensor for receiving the operation signal from the remote controller 400. The light receiving unit 207 transmits the received operation signal to the TV-CPU 201. The TV-CPU 201 performs various operations in response to the operation signal from the remote controller 400.

The remote controller 400 includes a operation unit 401 and a transmission unit 402. The operation unit 401 includes a plurality of operational buttons provided outside the remote controller 400. The transmission unit 402 outputs an optical operation signal according to an operation received by the operation unit 401. The operation unit 401 includes a power button. When the power button is operated, a power instruction signal is outputted. The light receiving unit 207 of the television receiver 200 receives the power instruction signal from the remote controller 400 to transmit the power instruction signal to the TV-CPU 201. The TV-CPU 201 switches the power state of the television receiver 200 when receiving the power instruction signal. Specifically, the TV-CPU 201 switches the power state from "ON" to "standby" when receiving the power instruction signal while the power state of the television receiver 200 is "ON". On the other hand, the TV-CPU 201 switches the power state from "standby" to "ON" when receiving the power instruction signal while the power state of the television receiver 200 is "standby". Since the electric power is not supplied to the light receiving unit 207 when the power state of the television receiver 200 is "OFF", the light receiving unit 207 does not receive the power instruction signal from the remote controller, and therefore the power state of the television receiver 200 is not changed.

2. Correspondence of Terms

The digital camera 100 is an example of an electronic device and a first device. The camera communication unit 103 is an example of a communication unit. The camera CPU 101 is an example of a detection unit, a setting unit, a receiving unit, and a controller. The power control signal is an example of a control signal. The battery mounting unit 105 is an example of a mounting unit and a determination unit. The camera operation unit 107 is an example of an operation receiving unit. The television receiver 200 is an example of an external device and a second device. The TV communication unit 203 is an example of a receiving unit. The TV-CPU 201 is an example of a changing unit. "standby" state is an example of a first power state, and "ON" state is an example of a second power state.

3. Operation of Linkage Operation System

An operation of the linkage operation system will be described with reference to flowcharts of FIG. 3 and the like.

Figure 3:
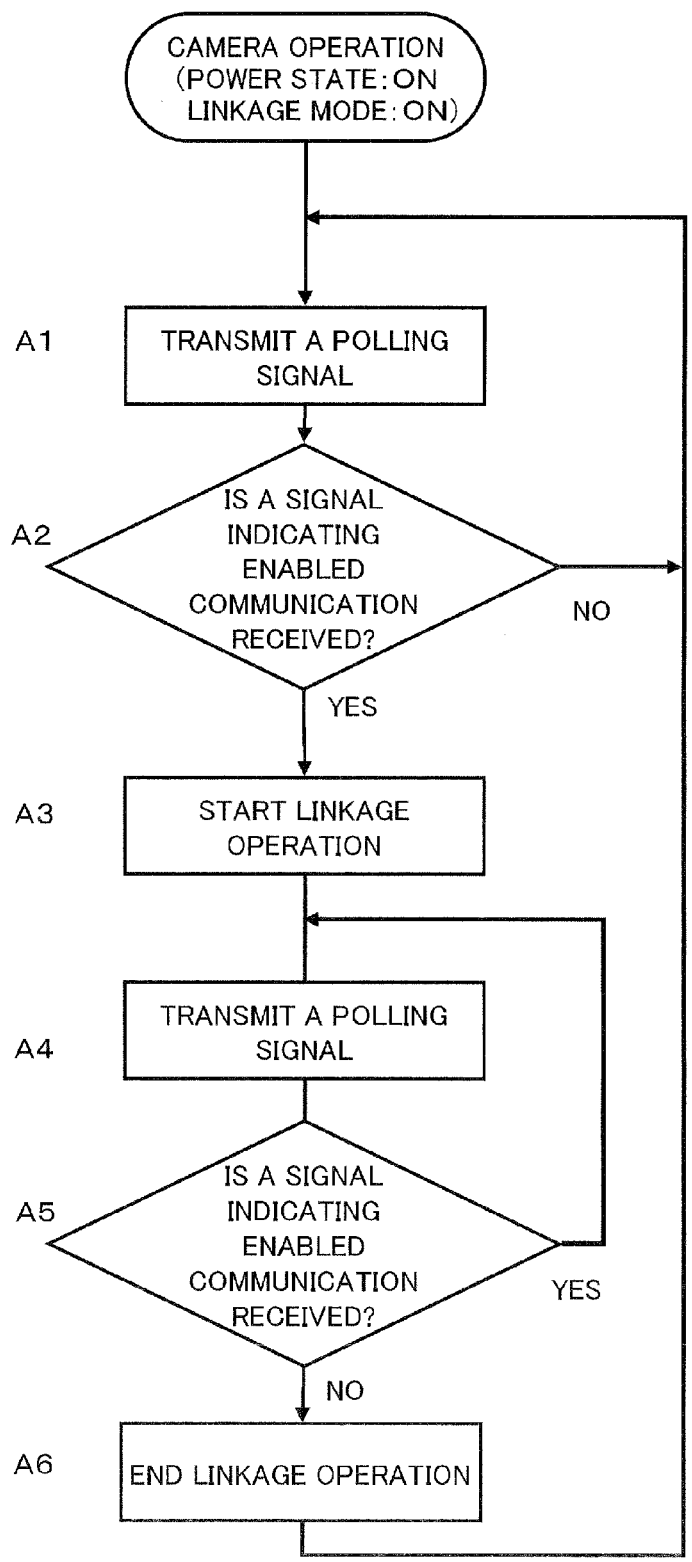
FIG. 3 is a flowchart for describing an example operation of a digital camera in the linkage operation system.
Figure 4:
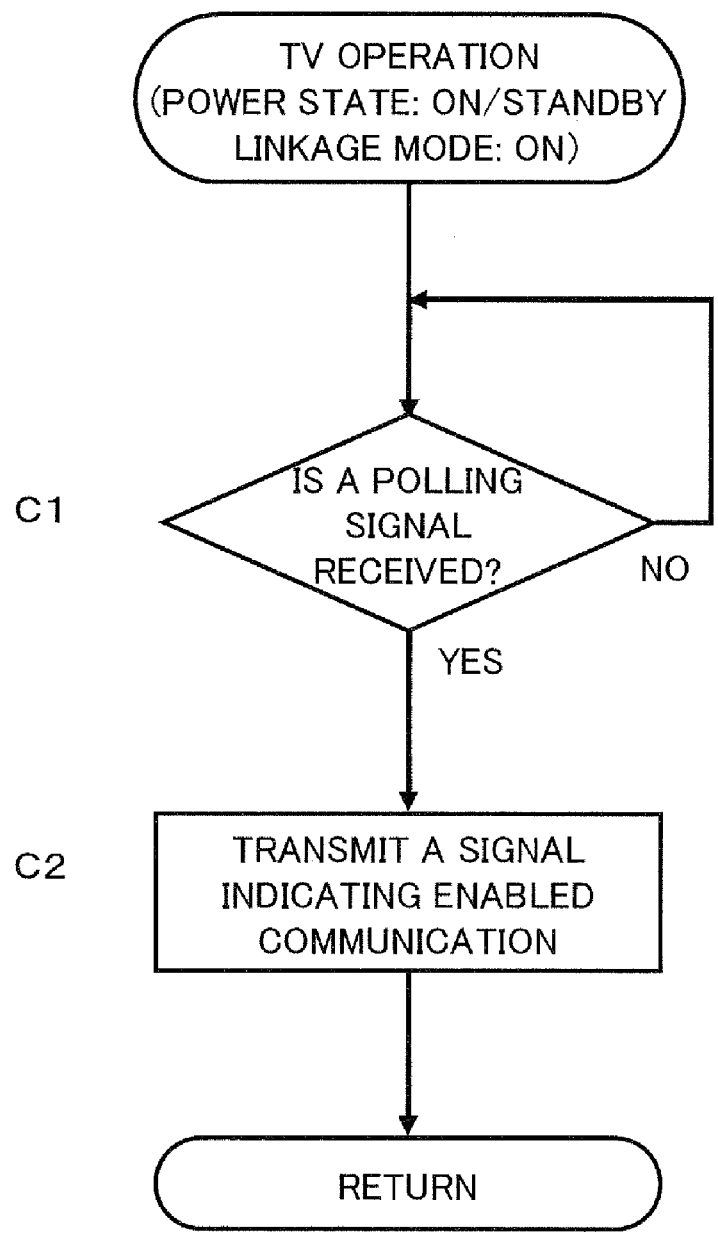
FIG. 4 is a flowchart for describing an example operation of a television receiver in the linkage operation system.
Figure 5:
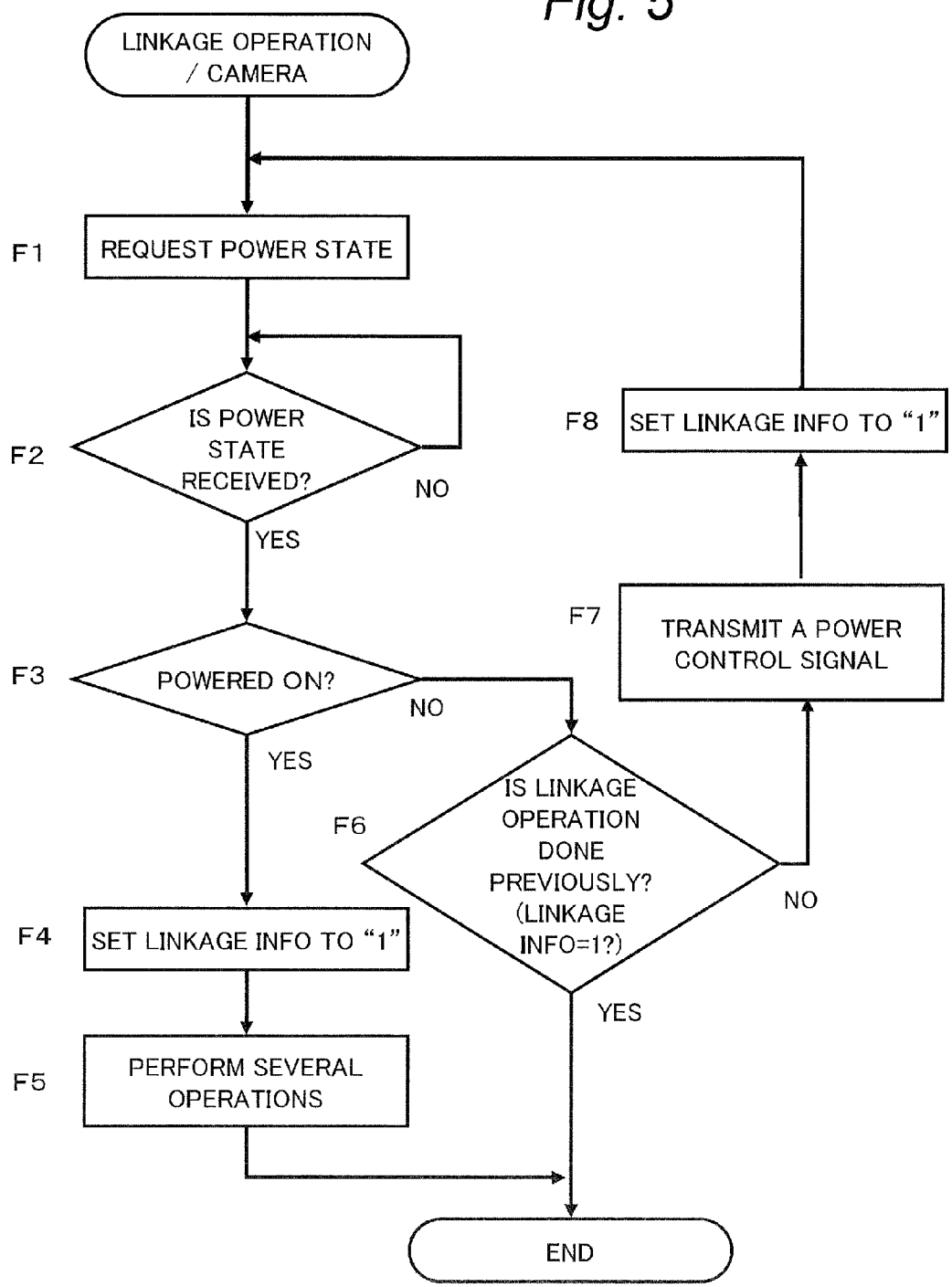
FIG. 5 is a flowchart for describing an example of a linkage operation of a digital camera.
Figure 6:
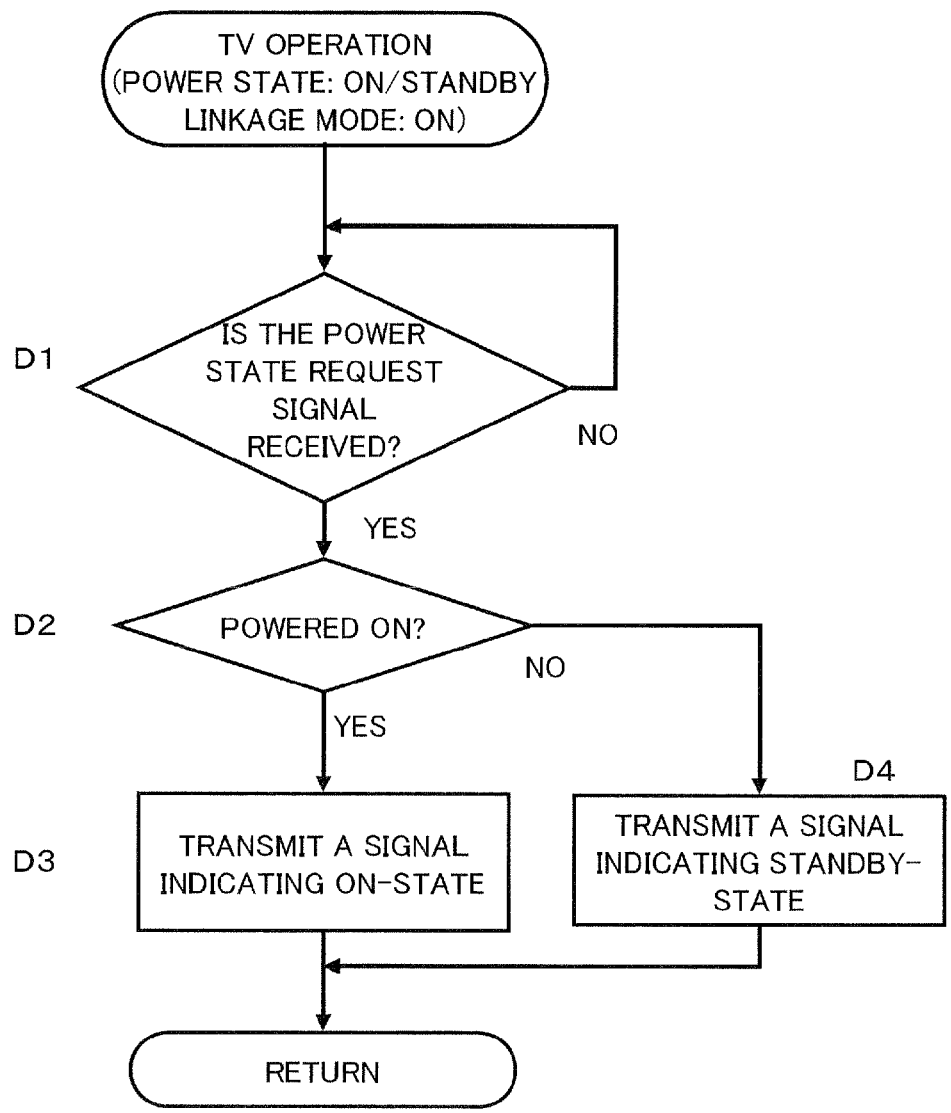
FIG. 6 is a flowchart for describing an example operation of the television receiver in receiving a power state request signal.
Figure 7:
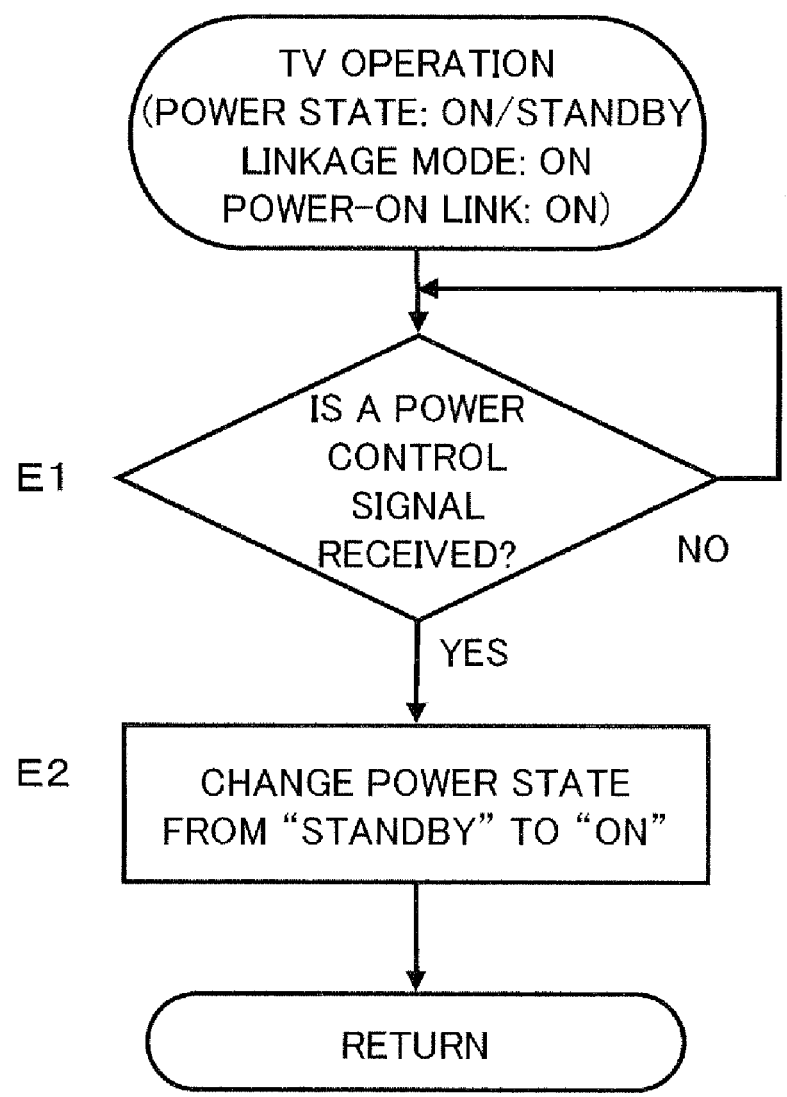
FIG. 7 is a flowchart for describing an example operation of the television receiver in receiving a power control signal.

Flowcharts of FIGS. 3 and 5 show example operations of the digital camera 100. FIG. 3 shows an operation of the digital camera 100 to be started when the linkage mode is set to "ON" and the power state is "ON" in the digital camera 100. FIG. 5 shows an example of the linkage operation of the digital camera 100. FIGS. 4, 6, and 7 are flowcharts showing exemplary operations of the television receiver 200. FIGS. 4 and 6 illustrate the operation of the television receiver 200 in which the power state is "standby" or "ON" and the linkage mode is set to "ON". FIG. 7 shows the operation of the television receiver 200, in which the power state is "standby" or "ON", the linkage mode is set to "ON", and simultaneously "power-on link" is set to "ON". That is, in the present embodiment, the operation of FIG. 7 is not performed when "power-on link" is set to "OFF" in the television receiver 200.

First, the operation of the digital camera 100 in which the power state is "ON" and the linkage mode is set to "ON" will be described with reference to FIG. 3. The camera CPU 101 starts the operation of FIG. 3, when the power state of the digital camera 100 is set to "ON" and the linkage mode is set to "ON".

The camera CPU 101 transmits a polling signal to the TV-CPU 201 (step A1). The camera CPU 101 determines whether a signal indicating that communication is enabled is received from the TV-CPU 201 (step A2). The camera CPU 101 continuously transmits the polling signal until the signal indicating that the communication is enabled is received (steps A1 and A2). The camera CPU 101 periodically (for example, every one second) transmits the polling signal. In this manner, the camera CPU 101 repeats steps A1 and A2 until the TV-CPU 201 sends back the signal indicating that the communication is enabled.

On the other hand, for the aforementioned operation of the camera CPU 101, the TV-CPU 201 operates as shown in FIG. 4 when the linkage mode is set to "ON" while the power state of the television receiver 200 is "ON" or "standby". Referring to FIG. 4, the TV-CPU 201 determines whether the polling signal is obtained from the camera CPU 101 (step C1). When obtaining the polling signal from the camera CPU 101, the TV-CPU 201 transmits the signal (Ack) indicating that the communication is enabled to the camera CPU 101 (step C2).

The camera CPU 101 can determine that the communication with the TV-CPU 201 is disabled when not receiving a response (a signal indicating that the communication is enabled) to the polling signal from the TV-CPU 201. On the contrary, the camera CPU 101 can determine that the communication with the TV-CPU 201 is enabled when receiving the response to the polling signal from the TV-CPU 201. In this manner, the camera CPU 101 can detect that the communication with the TV-CPU 201 is changed from "disabled" state to "enabled" state.

For example, it is assumed that the digital camera 100 and the television receiver 200 are not connected through the HDMI cable 300. Even in such cases, the camera CPU 101 transmits the polling signal. Since the digital camera 100 is not connected to the television receiver 200 through the HDMI cable, the digital camera 100 cannot receive the response from the TV-CPU 201. Accordingly, the camera CPU 101 determines that the communication is disabled. Then it is assumed that the digital camera 100 and the television receiver 200 are connected through the HDMI cable 300. In this case, since the camera CPU 101 continuously transmits the polling signal, the TV-CPU 201 sends back the signal indicating that the communication is enabled in response to the polling signal from the camera CPU 101. It should be noted that the TV-CPU 201 does not perform the operation as shown in FIG. 4, when the power state of the television receiver 200 is "OFF" or when the linkage operation mode is set to "OFF". In such cases, the camera CPU 101 determines that the communication is disabled because the camera CPU 101 cannot receive the response (the signal indicating that the communication is enabled) to the polling signal. Similarly, when the digital camera 100 and the television receiver 200 are not connected through the HDMI cable, the camera CPU 201 cannot transmit the polling signal to the television receiver 200. Accordingly, when the HDMI cable is not connected to the digital camera 100, the camera CPU 101 determines that the communication with the television receiver 200 is disabled.

Turning to FIG. 3, when receiving the signal indicating that the communication is enabled from the TV-CPU 201 (YES in step A2), the camera CPU 101 starts the linkage operation (step A3). The details of the linkage operation will be described below with reference to FIG. 5. The control shown in FIG. 3 and the control shown in FIG. 5 are performed in parallel.

After the start of the linkage operation, the camera CPU 101 transmits the polling signal (step A4). Then the camera CPU 101 determines whether the signal indicating that the communication is enabled is received (step A5). The camera CPU 101 repeats the processes in steps A4 and A5 while receiving the signal indicating that the communication is enabled. In this manner, the camera CPU 101 can detect that the communication with the TV-CPU 201 is changed from enabled state to disabled state.

For example, it is assumed that the digital camera 100 and the television receiver 200 are connected through the HDMI cable 300. It is further assumed that "power-on link" is set to "ON" while the power state of the television receiver 200 is "standby". In this case, the camera CPU 101 can obtain the signal indicating that the communication is enabled from the TV-CPU 201 by transmitting the polling signal to the TV-CPU 201. In such cases, it is assumed that the power state of the television receiver 200 is changed from "standby" to "OFF" due to the power outage and the like. When the power state of the television receiver 200 is changed to "OFF", the TV-CPU 201 does not perform the operation of FIG. 4 so that the camera CPU 101 cannot receive the response to the polling signal. Accordingly, the camera CPU 101 can detect that the communication is changed from "enabled" state to "disabled" state.

In this manner, when the camera CPU 101 becomes impossible to receive the signal indicating that the communication is enabled in step A5, the camera CPU 101 ends the linkage operation (operation of FIG. 5) (step A6). This is because the digital camera 100 becomes impossible to communicate with the television receiver 200. The operation in step A6 ends the parallel operations of FIGS. 3 and 5. After step A6, the control returns to step A1 and the above operations are performed.

3.1 Linkage Operation

The linkage operation in the digital camera 100 will be described in detail with reference to FIG. 5.

First, the camera CPU 101 transmits a signal for requesting the power state to the television receiver 200 (TV-CPU 201) (step F1).

When receiving the signal for requesting the power state, the television receiver 200 performs the operation as shown in FIG. 6. Referring to FIG. 6, when receiving the signal for requesting the power state (step D1), the TV-CPU 201 determines whether the power state of the power television receiver 200 is "ON" (step D2). When the power state of the power television receiver 200 is "ON", the TV-CPU 201 transmits a signal indicating "ON" state to the camera CPU 101 (step D3). On the other hand, the TV-CPU 201 transmits a signal indicating "standby" state to the camera CPU 101

(step D4), when the power state of the power television receiver 200 is not "ON", that is, when the power state is "standby".

The camera CPU 101 remains in "standby" state until the camera CPU 101 receives information indicating the power state from the TV-CPU 201 (step F2). In this manner, the camera CPU 101 can obtain the power state of the television receiver 200.

When receiving the information indicating the power state from the TV-CPU 201, the camera CPU 101 determines whether the received information indicating the power state indicates "ON" (step F3). When the received information on the power state indicates "ON", the camera CPU 101 sets the linkage information to the camera memory 102 (step F4).

The linkage information will now be described. The linkage information is information that indicates whether the digital camera 100 performs the linkage operation with the television receiver 200 before the current linkage is enabled, that is, whether the linkage operation between the digital camera 100 and the television receiver 200 is started. The camera memory 102 has an area (cooperative area) which can store the linkage information. Either one of "0" and "1" is set as the linkage information to the cooperative area. The value "0" indicates that the linkage operation with the television receiver 200 is not performed before the current linkage is enabled, that is, that the linkage operation between the digital camera 100 and the television receiver 200 is not started. The value "1" indicates that the linkage operation with the television receiver 200 is performed before the current linkage is enabled, that is, that the linkage operation between the digital camera 100 and the television receiver 200 is started. The linkage information is initialized (reset) to "0" when the power state of the digital camera 100 is changed from "OFF" to "ON". Then the linkage information is set to "1" when the linkage between the digital camera 100 and the television receiver 200 is initially enabled. By referring to the linkage information, it is possible to determine whether the digital camera 100 and the television receiver 200 cooperate with each other after the digital camera 100 is turned on. In step F4, the data linkage information is set to "1".

Turning to FIG. 5, the control proceeds to various operations necessary for the linkage when the operation in step F4 is completed (step F5). There is no particular limitation to the various operations necessary for the linkage. For example, the digital camera 100 may obtain the operation signal (numeric keypad information) of the remote controller 400 from the television receiver 200 and perform the operation according to the operation signal.

On the other hand, when the received information indicating the power state does not indicate "ON" in step F3, that is, when the power state is "standby", the camera CPU 101 determines whether the linkage with the television receiver 200 is performed before the current communication is changed to "enable" state from "disable" state (step F6). Specifically, the camera CPU 101 determines whether the linkage information is set to "1" (step F6).

The camera CPU 101 ends the linkage operation when the linkage information is set to "1". In this case, the power control signal for turning on the television receiver 200 is not transmitted to the TV-CPU 201. That is, the power control signal is prohibited to be transmitted to the television receiver 200. On the other hand, the camera CPU 101 transmits the power control signal to the TV-CPU 201 when the linkage information is not set to "1" (step F7).

When receiving the power control signal, the TV-CPU 201 performs the operation of FIG. 7. That is, as shown in FIG. 7, when the TV-CPU 201 receives the power control signal (step E1), the TV-CPU 201 changes the power state of television receiver 200 from "standby" to "ON" (step E2).

Referring to FIG. 5, the camera CPU 101 sets the linkage information to "1" (step F8) after transmitting the power control signal, and the control returns to step F1. That is, the camera CPU 101 transmits the signal for requesting the power state to the TV-CPU 201. When the camera CPU 101 obtains the power state and detects that the power state becomes "ON", the camera CPU 101 stores the linkage information of "1" in the camera memory 102 (step F4). The camera CPU 101 then proceeds to various operations.

When the camera operation unit 107 is operated by the user, the camera CPU 101 resets the linkage information stored in the camera memory 102. That is, the linkage information stored in the camera memory 102 is changed from "1" to "0" when the camera operation unit 107 is operated by the user. With this arrangement, operating the camera operation unit 107 by the user causes the digital camera 100 to transmit the control signal to the television receiver 200. That is, the linkage information is reset to "0" by user's operation on the operation unit 107, and thus the camera CPU 101 can detect that the communication is changed from "disable" state to "enable" state. Further, the power control signal can be transmitted to the TV-CPU 201 when the power state of the television receiver 200 is "standby".

A difference between an operation of a conventional linkage operation system and the operation of the linkage operation system of the present embodiment will be described below with a specific example.

Figure 8:
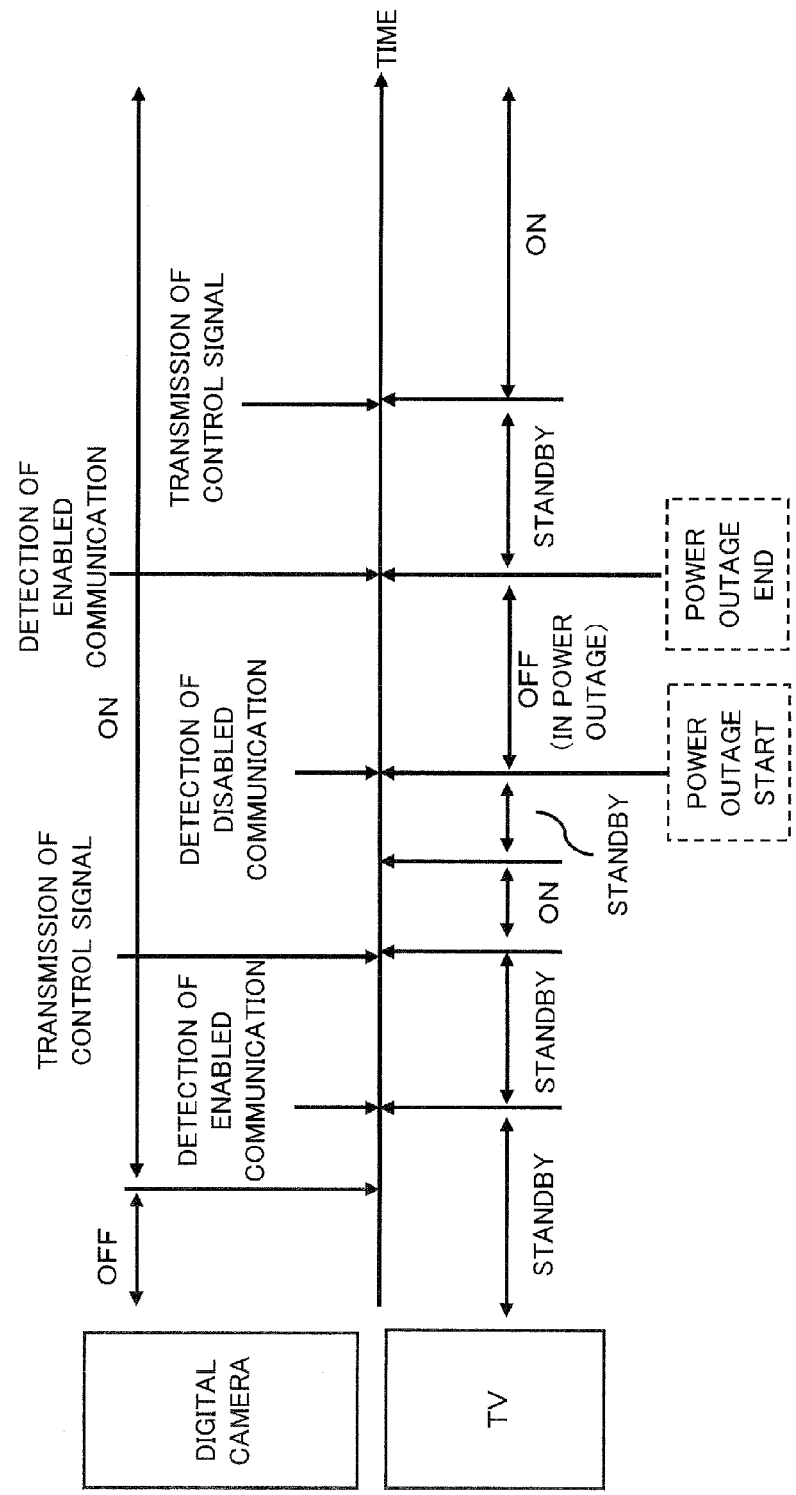
FIG. 8 is a view for describing an example operation of a conventional linkage operation system.
Figure 9:
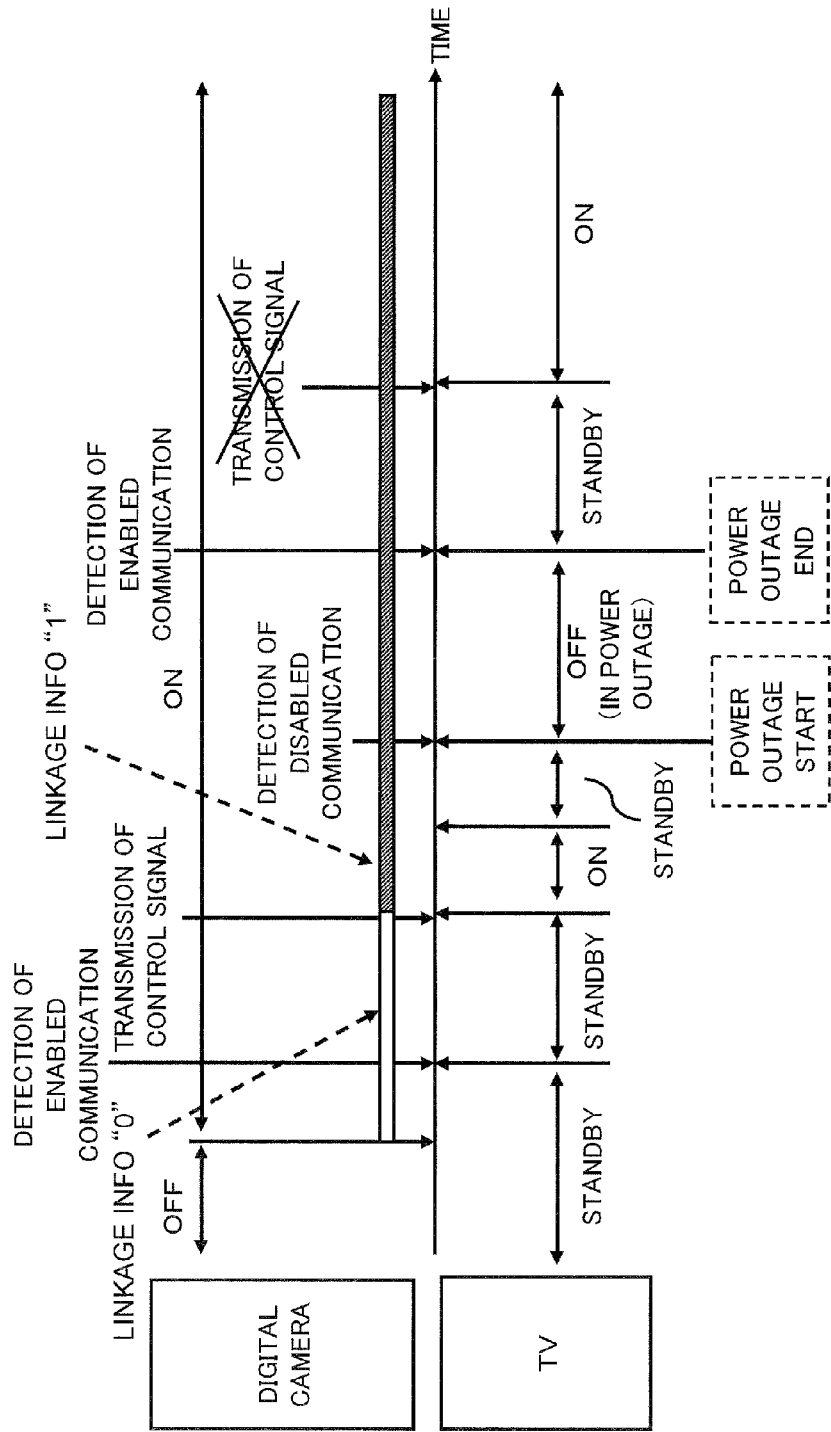
FIG. 9 is a view for describing a specific example of the linkage operation of the linkage operation system.

FIG. 8 is a view showing a specific example of the operation of the conventional linkage operation system. FIG. 9 is a view showing a specific example of the operation of the linkage operation system of the present embodiment.

The operation of the conventional linkage operation system will be described with reference to FIG. 8. It is assumed that firstly the digital camera is turned off, the television receiver is turned off, and the digital camera and the television receiver are connected through the HDMI cable. When the digital camera is turned on, the digital camera detects that the communication is changed from "disable" state to "enable" state according to the above-described procedure. The digital camera transmits the power control signal to the television receiver since the power state of the television is "standby". The television receiver is turned on in response to the power control signal. Then, when the user changes the power state of the television receiver from "ON" to "standby" and afterward the power outage occurs, the television receiver is turned off. The digital camera detects that the communication is changed to "disabled state" from "enabled state". When the power outage ends and the electric power is supplied again, the power state of the television receiver returns to "standby". Therefore, the digital camera detects that the communication is changed from "disable" state to "enable" state. Because the power state of the television receiver is "standby", the digital camera transmits the power control signal to the television receiver, so that the television receiver is turned on in response to the power control signal. Thereafter, there is a problem that the television receiver is left turned on.

Referring to FIG. 9, the operation of the linkage operation system of the present embodiment will be described with a specific example. First, it is assumed that the digital camera 100 is turned off, the television receiver 200 is turned off, and the digital camera 100 and the television receiver 200 are connected through the HDMI cable 300. In this situation, when the digital camera 100 is turned on, the digital camera 100 detects that the communication is changed from "disable" state to "enable" state. In this case, the power state of the television receiver 200 is "standby" state (NO in step F3 of FIG. 5) and the linkage information is set to the initial value of "0", and therefore the digital camera 100 transmits the power control signal to the television receiver 200 (step F7 of FIG. 5). The digital camera 100 then sets the linkage information to "1" (step F8 of FIG. 5), and the digital camera 100 stores the linkage information of "1" in the camera memory 102. The television receiver 200 is turned on in response to the power control signal.

Thereafter, when the power state of the television receiver 200 is changed from "ON" to "standby" and then the power outage occurs, the television receiver 200 is turned off due to the power outage. At this point, the digital camera 100 detects that the communication is changed from "enable" state to "disable" state. Afterward, when the power outage ends, the power state of the television receiver 200 returns to "standby". At this time, the digital camera 100 detects that the communication is changed from "disable" state to "enable" state. Since the linkage information is set to "1" (YES in step F6 of FIG. 5), although the power state of the television receiver 200 returns to "standby", the digital camera 100 does not transmit the power control signal to the television receiver 200. Accordingly, even though the television receiver 200 is turned off due to the power outage and then the power outage ends so that the power state of the television receiver 200 is changed from "OFF" to "standby", the digital camera 100 can prevent the control to change power state of the television receiver 200 from "standby" to "ON".

As mentioned above, the digital camera 100 of the present embodiment refers to the linkage information to determine whether the linkage operation between the digital camera 100 and the television receiver 200 is previously performed, and does not transmit the power control signal to television receiver 200 (that is, prohibits the transmission of power control signal) when the linkage operation is already performed. According to this arrangement, the trouble that the power state of the television receiver 200 is automatically changed from "standby" to "ON" when the power outage occurs can be prevented.

3.2 Another Example of Linkage Operation

Another example of the linkage operation in the digital camera 100 will be described with reference to FIG. 10. The camera CPU 101 sets the linkage information in consideration of the presence or absence of the previous linkage operation (step B1). The set linkage information is stored in the camera memory 102. In this example, the linkage information is set to either one of "0", "1", and "2". The value "0" is an initial value indicating that the linkage has not been previously performed (the linkage has not started yet). The linkage information is initialized to "0" when the power state of the digital camera 100 is changed from "OFF" to "ON". The value "1" indicates that the linkage has not been previously performed (the linkage has not started yet), and the value "2" indicates that the linkage has been previously performed (the linkage has started).

In setting the linkage information in step B1, the camera CPU 101 sets the linkage information to "1" to store the linkage information in the camera memory 102 when the linkage is not performed before the current linkage is enabled (i.e., before the current communication is enabled), that is, when the linkage information is "0". On the other hand, when the linkage is previously performed before the current linkage is enabled, that is, when the linkage information is "1", the camera CPU 101 sets the linkage information to "2" to store the linkage information in the camera memory 102. The camera CPU 101 newly sets the linkage information to "1" when the linkage information stored in the camera memory 102 is "0", and the camera CPU 101 newly sets the linkage information to "2" when the linkage information is "1".

The camera CPU 101 transmits the signal for requesting the power state to the TV-CPU 201 after setting the linkage information (step B2). When receiving the signal for requesting the power state, the television receiver 200 performs the operation as shown in FIG. 6 as described above.

Then the camera CPU 101 waits until the camera CPU 101 receives the signal indicating the power state from the TV-CPU 201 (step B3). Hence, the camera CPU 101 can obtain the power state of the television receiver 200.

The camera CPU 101 determines whether the power state indicates "ON" when obtaining the power state of the television receiver 200 from the TV-CPU 201 (step B4). When the power state indicates "ON", the camera CPU 101 executes various operations necessary for the linkage (step B5). There is no particular limitation to the various operations. For example, as one of the various operations, the digital camera 100 may obtain the operation signal (numeric keypad information) of the remote controller 400 from the television receiver 200, and perform the operation according to the operation signal.

When the power state does not indicate "ON", that is, when the power state "standby", the camera CPU 101 refers to the linkage information to determine whether the linkage with the television receiver 200 is performed before the current communication is changed from "disable" state to "enable" state (step B6). Specifically, the camera CPU 101 determines whether the linkage information is "2" when the power state is not "ON" (i.e., when the power state is "standby").

When the linkage information is not "2", the control of the camera CPU 101 proceeds to step B8. When the linkage information is "2", the camera CPU 101 determines whether the camera operation unit 107 such as the arrow key provided in the digital camera 100 is operated within a predetermined time (for example, 10 minutes) (step B7). For example, the predetermined time may be measured from the time the power state is received or the time the control proceeds to the processing in step B7. When the camera operation unit 107 is operated within the predetermined time, the camera CPU 101 proceeds to step B8. When the camera operation unit 107 is not operated within the predetermined time, the camera CPU 101 ends the linkage operation. The camera CPU 101 is configured to confirm existence of the user by receiving the operation within the predetermined time.

As described above, when the power state of the television receiver is changed from "ON" or "standby" to "OFF" due to the power outage and then becomes "standby" after the end of the power outage, the television receiver is automatically turned on under the control of the digital camera, so that there is a problem that the television receiver is left as it is in "ON". If the user exists near the digital camera, the television receiver can be turned off soon even though the television receiver is automatically turned on. To solve this problem, the digital camera 100 transmits the power control signal to the TV-CPU 201 when the camera operation unit 107 receives the instruction from the user, even if the linkage is performed before the current communication is detected. The linkage information may be reset to "0" when the camera operation unit 107 is operated within the predetermined time in step B7.

In step B8, the camera CPU 101 transmits the power control signal to the TV-CPU 201. When receiving the power control signal, the TV-CPU 201 performs the operation as shown in FIG. 7 to change the power state of the television receiver 200 from "standby" to "ON" as described above.

After the processing in step B8, the camera CPU returns to step B2 to perform the operation for requesting the power state. The camera CPU 101 then obtains the power state in step B3. When detecting that the power state becomes "ON", the camera CPU proceeds to step B5 to execute various operations.

Figure 10:
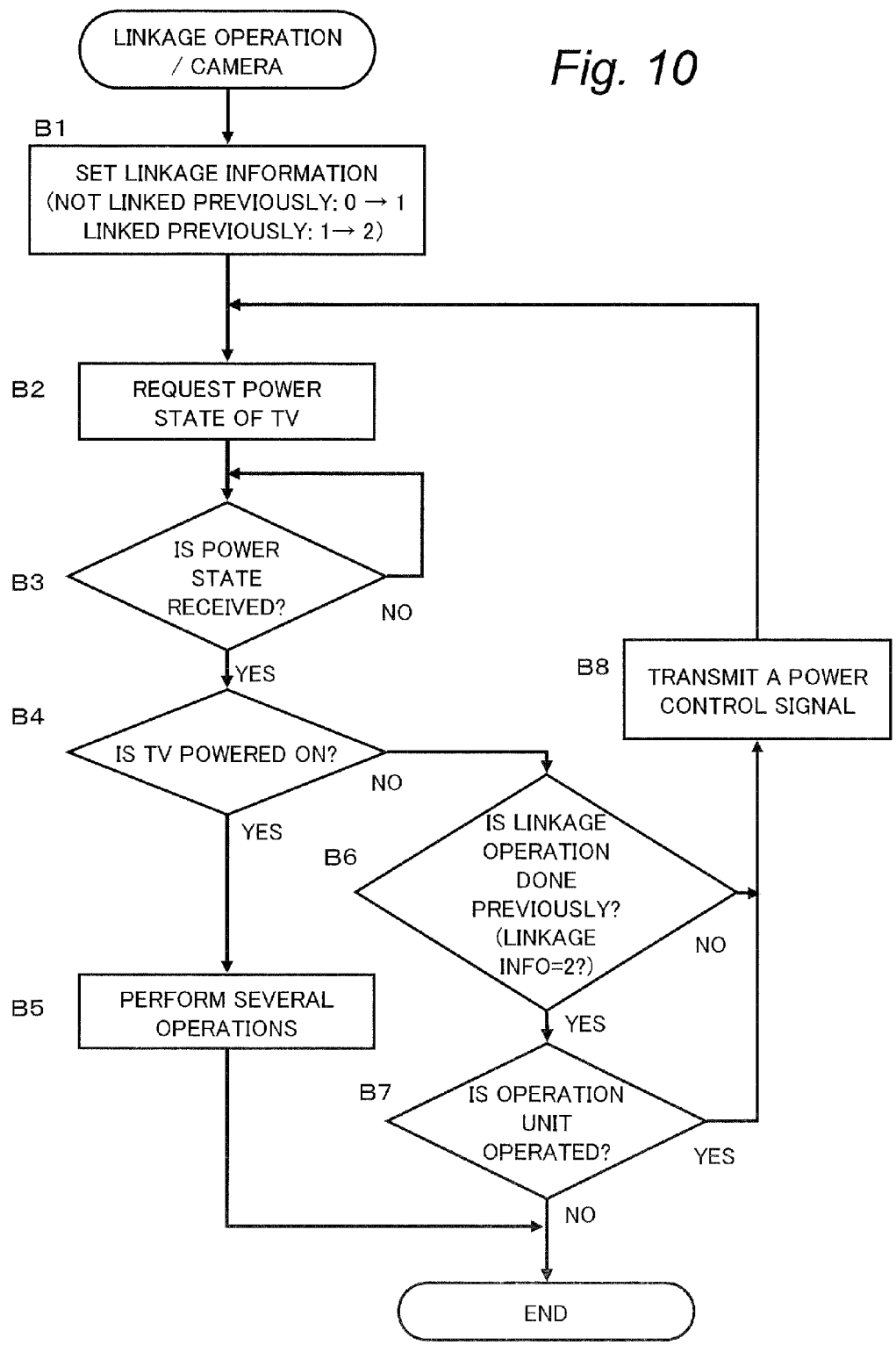
FIG. 10 is a flowchart for describing another example of the linkage operation of the digital camera.
Figure 11:
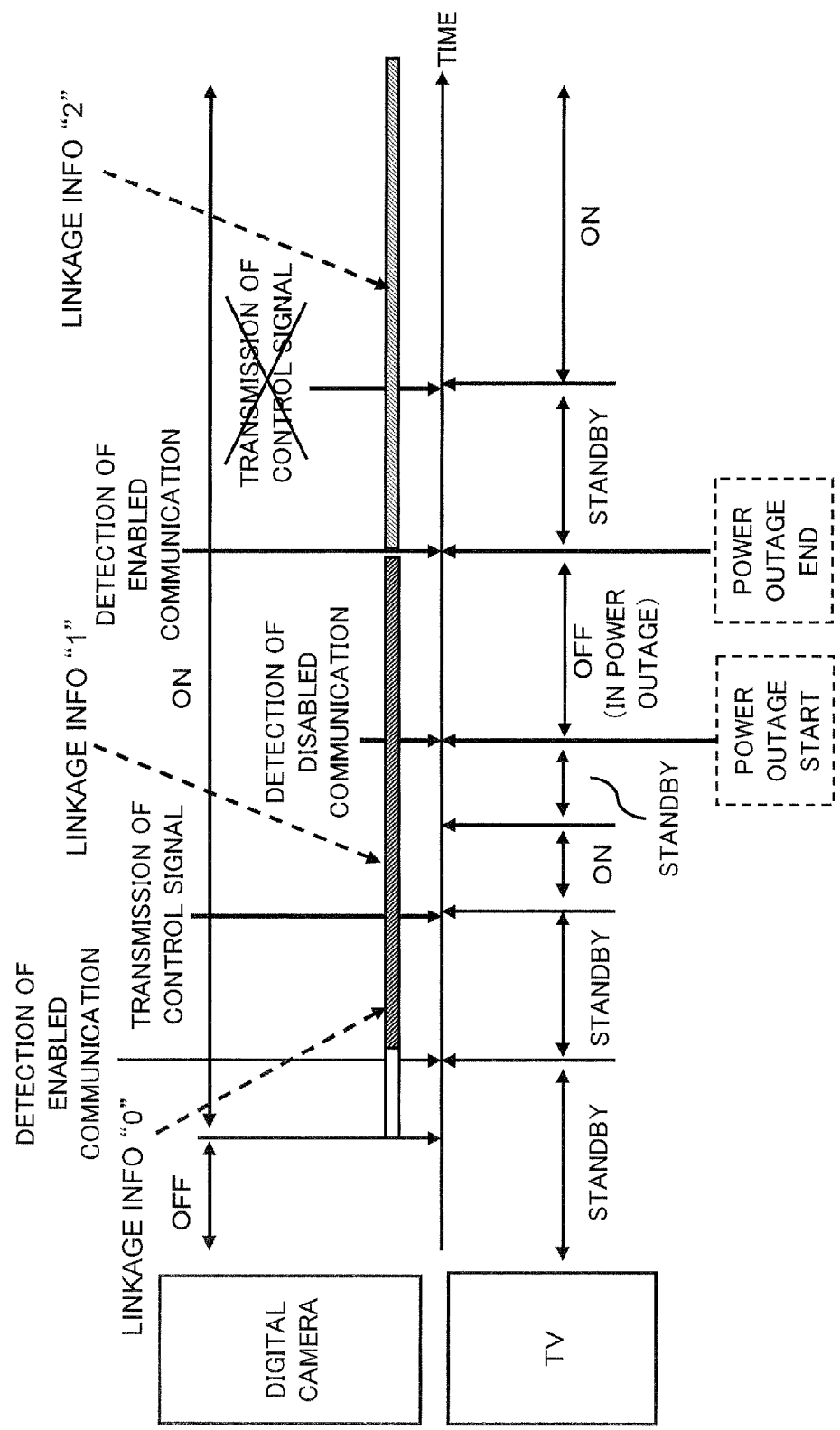
FIG. 11 is a view for describing another specific example of the linkage operation of the linkage operation system.

Referring to FIG. 11, the linkage operation as shown in FIG. 10 will be described with a specific example. FIG. 11 is a view for describing the linkage operation of FIG. 10 with a specific example. Firstly, it is assumed that the digital camera 100 is turned off, the television receiver 200 is turned off, and the digital camera 100 and the television receiver 200 are connected through the HDMI cable 300. In this situation, when the digital camera 100 is turned on, the digital camera 100 detects that the communication is changed from "disable" state to "enable" state. At this time, the linkage information is initialized to "0" by turning on the digital camera 100, and thus the digital camera 100 sets the linkage information to "1" (step B1 of FIG. 10). The power state of the television receiver 200 is "standby" (NO in step B4 of FIG. 10) and the linkage is not performed (linkage information="1") before the digital camera 100 detects that the communication is enabled (YES in step B6 of FIG. 10). Therefore, the digital camera 100 transmits the power control signal to the television receiver 200 (step B8 of FIG. 10). The television receiver 200 is turned on in response to the power control signal. Then, the user changes the power state of the television receiver 200 from "ON" to "standby". Afterward when the power outage occurs, the television receiver 200 is turned off, so that the digital camera 100 detects that the communication is changed from "enable" state to "disable" state. When the power outage is ended, the power state of the television receiver 200 returns to "standby", so that the digital camera 100 detects that the communication is changed from "disable" state to "enable" state. At this time, since the stored linkage information is "1", the digital camera 100 updates the linkage information to "2" (step B1 of FIG. 10). The digital camera 100 does not transmit the power control signal, because the linkage information is "2" although the power state of the television receiver 200 is "standby" (YES in step B6 of FIG. 10). Thus, the operation of FIG. 10 can also prevent the problem that the power state of the television receiver 200 is automatically changed from "standby" to "ON" when the power outage occurs.

4. Summary

The present embodiment discloses the digital camera 100 capable of communicating with the television receiver 200, which includes the TV communication unit 203 for receiving the power control signal and the TV-CPU 201 for changing the power state from "standby" to "ON" in response to the power control signal received through the TV communication unit 203.

The digital camera 100 includes the camera communication unit 103 that communicates with the television receiver 200, and the camera CPU 101 that detects that the communication with the television receiver 200 through the camera communication unit 103 is changed from "disable" state to "enable" state. The camera CPU 101 stores the signal indicating the linkage with the television receiver 200 in the camera memory 102, when the camera CPU 101 detects that the communication with the television receiver 200 is enabled. The camera CPU 101 receives the signal indicating the power state of the television receiver 200 through the camera communication unit 103, when the camera CPU 101 detects that the communication with the television receiver 200 is enabled. The camera CPU 101 transmits the power control signal to the television receiver 200 through the camera communication unit 103, when the power-state signal received by the camera CPU 101 indicates "standby" and when the camera memory 102 does not store the information that indicates the linkage before the camera CPU 101 detects that the communication is enabled.

With this configuration, the power control signal can be transmitted to the television receiver 200, when the power-state signal obtained from the television receiver 200 indicates "standby" and at the same time the signal indicating the linkage before the communication is enabled is not stored in the camera memory 102. Accordingly, the digital camera 100 can transmit the power control signal at appropriate timing.

Other Embodiments

As an embodiment of the present invention, the first embodiment is described above by way of example. However, the embodiment is not limited to the first embodiment, but can also be realized in other embodiments. Therefore, other embodiments are described below.

In the first embodiment, the digital camera 100 is used as an example of the electronic device. Alternatively, for example, a mobile telephone, a movie camera, and a portable television, a portable BD (Bru-ray (Trademark)) player, a portable DVD player, and so on may be used as the electronic device. In the first embodiment, the television receiver 200 is used as an example of the external device. The external device is not limited to this. For example, a BD recorder, a DVD recorder, a printer, and a projector may be used as the external device.

Only when the power supply to the digital camera 100 is not the commercial power source, for example, when the secondary battery is mounted to the digital camera 100, the operations of FIGS. 3 and 5 or the operation of FIG. 10 may be performed. In the first embodiment, the operations of FIGS. 3 and 5 or the operation of FIG. 10 is performed when the linkage operation mode is set to "ON" and the power state is "ON". The operation is not limited to this manner. The camera CPU 101 may perform the operations of FIGS. 3 and 5 or the operation of FIG. 10 only when the power supply mounted to the battery mounting unit 105 is determined as a battery. This is because, when the digital camera 100 is connected to the commercial power source, the linkage information is reset by occurrence and end of the power outage, and thus the operation of FIG. 5 or FIG. 10 to obtain the original purpose cannot correctly be performed. Therefore, the operations of FIGS. 3 and 5 or the operation of FIG. 10 may be performed only when the secondary battery is mounted on the digital camera 100, that is, only when the digital camera 100 is not influenced by the power outage.

In the first embodiment, the digital camera 100 repeatedly transmits the polling signal to the television receiver 200 and receives the response to detect that the communication with the television receiver 200 is changed from "disable" state to "enable" state. However, the operation is not limited to this.

In the first embodiment, the digital camera 100 and the television receiver 200 are connected through the HDMI cable 300. Alternatively, the digital camera 100 and the television receiver 200 may be connected through another type cable capable of transmitting the control signal. In the first embodiment, the digital camera 100 and the television receiver 200 are connected in the wired way. Alternatively, the digital camera 100 and the television receiver 200 may be connected via wireless connection. In this case, it is necessary to replace the hardware interfaces of the television communication unit and camera communication unit.

In the first embodiment, the digital camera 100 and the television receiver 200 are directly connected through the HDMI cable 300. The connection is not limited to this manner. The digital camera 100 and the television receiver 200 may indirectly be connected. For example, the digital camera and an amplifier may be connected through the HDMI cable, or the amplifier and the television receiver may be connected through the HDMI cable. This allows the digital camera 100 and the television receiver 200 to be indirectly connected.

In the first embodiment, the television receiver is used as an example of the external device. However, the external device is not limited thereto. The concept of the first embodiment can be applied to various electronic devices such as a personal computer, a portable optical disk player, and a portable television, as long as the electronic device includes an interface (for example, HDMI) that can receive the power control command from another device through the communication line. The digital camera is used as an example of the electronic device. However, the electronic device is not limited thereto. The concept of the first embodiment can be applied to various electronic devices such as a movie camera, a mobile telephone, a portable information terminal, a portable BD player, a portable DVD player, and another electric device that is driven by a battery and includes an interface (for example, HDMI) capable of transmitting the power control command to another device through the communication line.

The aforementioned technical concept is not limited to the above embodiment but can be realized in various embodiments.

INDUSTRIAL APPLICABILITY

The electronic device of the aforementioned embodiment can be applied to a digital camera, a movie camera, a portable television, a mobile telephone, a portable BD player, a portable DVD player, and the like.

Although the explanation has been made in connection with specified embodiments thereof, many other modifications, corrections and applications are apparent to those skilled in the art. Therefore, the present embodiment is not limited by the disclosure provided herein.

What is claimed is:

1. An electronic device that communicates with an external device and can change a power state of the external device from a first power state to a second power state, the electronic device comprising:
    a communication unit operable to communicate with the external device;
    a storage unit operable to store information indicating linkage between the electronic device and the external device;
    a detection unit operable to detect that communication between the electronic device and the external device through the communication unit is enabled;
    a determination unit operable to determine whether the information indicating linkage is stored in the storage unit when the detection unit detects that the communication between the electronic device and the external device is enabled;
    a transmitting unit operable to store the information indicating linkage in the storage unit and transmit a control signal to the external device for controlling the power state of the external device to the second power state when the determination unit determines that the information indicating linkage is not stored in the storage unit, and operable to refrain from transmitting the control signal to the external device when the determination unit determines that the information indicating linkage is stored in the storage unit.

2. The electronic device according to claim 1, further comprising
    a receiving unit operable to receive a signal indicating the power state of the external device through the communication unit when the detection unit detects that the communication between the electronic device and the external device is enabled,
    wherein only in cases where the signal received by the receiving unit indicates the first power state, the transmitting unit performs the operation to store the information indicating linkage in the storage unit and transmit the control signal to the external device for controlling the power state of the external device to the second power state when the determination unit determines that the information indicating linkage is not stored in the storage unit.

3. The electronic device according to claim 2, further comprising:
    an operation receiving unit operable to receive operation of a user to the electronic device,
    wherein when the operation receiving unit receives the operation of the user, the control signal is transmitted to the external device even though the determination unit determines that the information indicating linkage is stored in the storage unit when the signal received by the receiving unit indicates the first power state.

4. The electronic device according to claim 1, wherein the first power state is a standby state and the second power state is an ON state.

5. The electronic device according to claim 1, further comprising:
    a mounting unit to which a battery-type power supply is connected; and
    a judging unit operable to judge whether the battery-type power supply is connected to the mounting unit,
    wherein only in cases where the judging unit judges that the battery-type power supply is connected to the mounting unit, the transmitting unit performs the operation to store the information indicating linkage in the storage unit and transmit the control signal to the external device for controlling the power state of the external device to the second power state when the determination unit determines that the information indicating linkage is not stored in the storage unit.

6. The electronic device according to claim 1, wherein the transmitting unit resets the information indicating linkage when the electronic device is turned from a power OFF state to a power ON state.

7. The electronic device according to claim 1, further comprising:
    an operation receiving unit operable to receive operation of a user to the electronic device; and
    a reset unit operable to reset the linkage information when the operation receiving unit receives the operation of the user.

8. The electronic device according to claim 1, which communicates with the external device through an HDMI (High Definition Multimedia Interface).

9. The electronic device according to claim 1, which is an imaging device for capturing a subject image to generate image data.

10. The electronic device according to claim 1, wherein the external device is one of a television receiver, a personal computer, and an optical disk reproducing apparatus.

11. A method for controlling a power state of a second device from a first power state to a second power state by a first device, the method comprising:

detecting whether communication between the first device and the second device is enabled;

determining whether information indicating linkage between the first device and the second device is stored when it is detected that the communication between the first device and the second device is enabled;

when it is determined that the information indicating linkage is not stored, storing the information indicating linkage and transmitting a control signal to the second device for controlling the power state of the second device to the second power state, and when it is determined that the information indicating linkage is stored, refraining from transmitting the control signal to the second device.

12. The method according to claim 11, further comprising obtaining the power state of the second device when it is detected that the communication between the first device and the second device is enabled, wherein only in cases where the obtained power state of the second device indicates the first power state, the information indicating linkage is stored and the control signal is transmitted to the second device for controlling the power state of the second device to the second power state when it is determined that the information indicating linkage is not stored.

13. The method according to claim 11, wherein the first power state is a standby state and the second power state is an ON state.

* * * * *